United States Patent [19]

Owens

[11] Patent Number: 4,642,976

[45] Date of Patent: Feb. 17, 1987

[54] LAWN MOWER TRIMMER AND EDGER ATTACHMENT

[76] Inventor: Boyd L. Owens, P.O. Box 142, Cartersville, Okla. 74934

[21] Appl. No.: 778,047

[22] Filed: Sep. 20, 1985

[51] Int. Cl.$^4$ .......................................... A01D 53/14
[52] U.S. Cl. ...................... 56/16.9; 56/12.7; 56/10.7; 56/11.8; 56/DIG. 4
[58] Field of Search .............. 56/10.7, 11.7, 11.8, 56/12.7, 16.9, 17.1, 17.5, 233, 239, 295, DIG. 4

[56] References Cited

U.S. PATENT DOCUMENTS

| | | | |
|---|---|---|---|
| 3,191,368 | 6/1965 | Hidalgo | 56/16.9 |
| 3,193,996 | 7/1965 | Wellborn | 56/16.9 |
| 3,236,037 | 2/1966 | Porterfield | 56/16.9 |
| 3,407,579 | 10/1968 | Decker | 56/16.9 |
| 3,531,922 | 10/1970 | Hansen | 56/16.9 |
| 3,604,208 | 9/1971 | Borunda | 56/11.5 |
| 3,693,334 | 9/1972 | Lowery | 56/16.9 |
| 3,803,818 | 5/1974 | Chaney | 56/16.9 |
| 3,871,160 | 3/1975 | Hooper | 56/16.9 |
| 3,977,078 | 8/1976 | Pittinger | 56/16.9 |
| 4,031,696 | 6/1977 | Fleigle | 56/11.9 |
| 4,170,099 | 10/1979 | Owens | 56/16.9 |
| 4,242,855 | 1/1981 | Beaver | 56/13.7 |
| 4,270,271 | 6/1981 | Feldman et al. | 56/12.7 |
| 4,333,302 | 6/1982 | Thomas et al. | 56/11.9 |
| 4,335,585 | 6/1982 | Hoff | 56/12.7 |
| 4,442,659 | 4/1984 | Enbuok | 56/12.7 |
| 4,453,372 | 6/1984 | Remer | 56/13.7 |

*Primary Examiner*—Gene Mancene
*Assistant Examiner*—John G. Weiss
*Attorney, Agent, or Firm*—Dowell & Dowell

[57] ABSTRACT

This specification discloses a cutting head and mounting assembly for adjustably supporting the cutting head on a mower. The mounting assembly for the head permits easy adjustment of the height of the head above the ground, its horizontal angle with respect to the frame of the mower, and the inclination of the head from a horizontal to a vertical orientation or any angle of inclination therebetween. At the end of the head opposite its cutting flail members, there is a quick detach joint which allows, either an electric motor to be mounted and energized through a switch by electrical power available aboard the mower, or alternatively allows a cable drive to be mounted which drives the head from a friction drive mechanism taking power from the mower engine shaft, the friction drive being selectively engageable by means of a Bowden control cable. A guard to deflect cuttings away from the operation is mounted on the cutting head.

3 Claims, 8 Drawing Figures

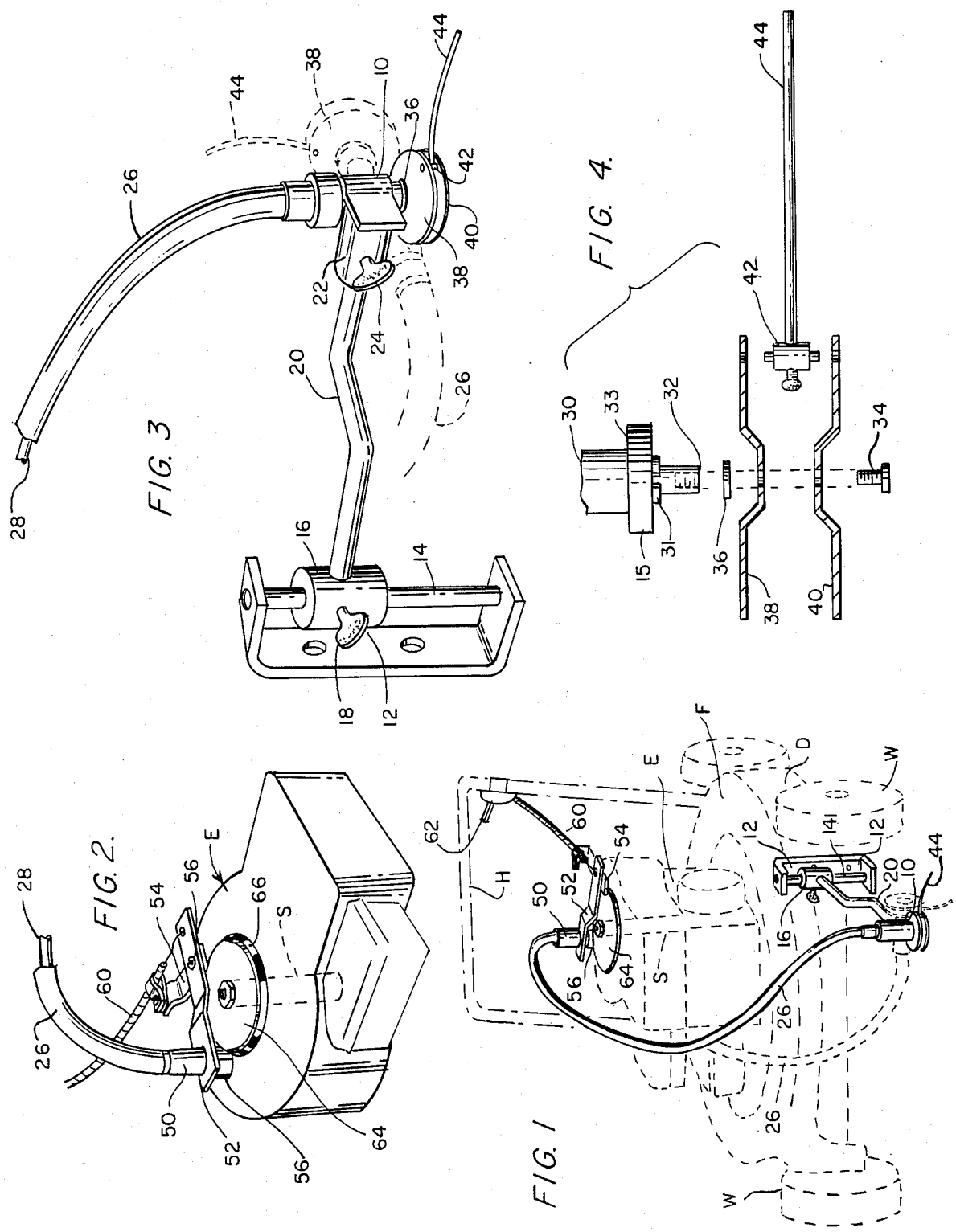

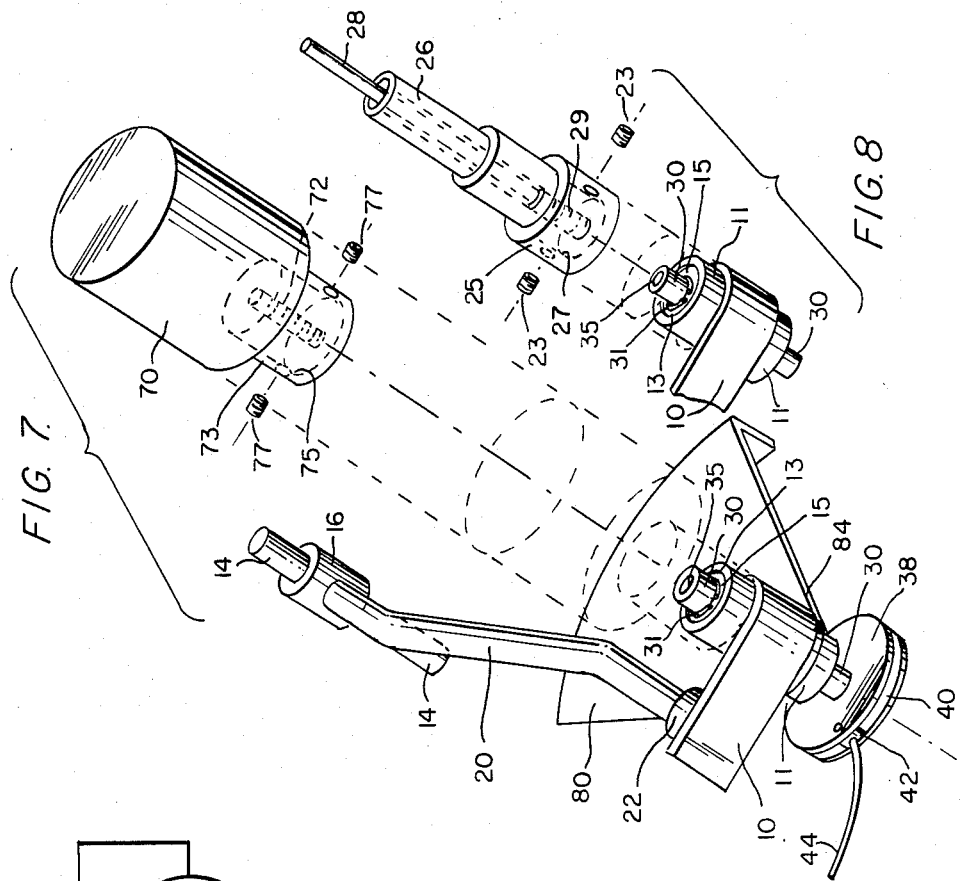
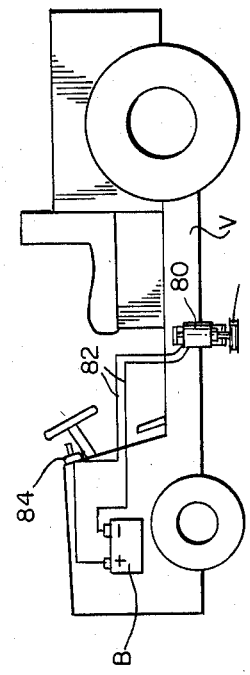
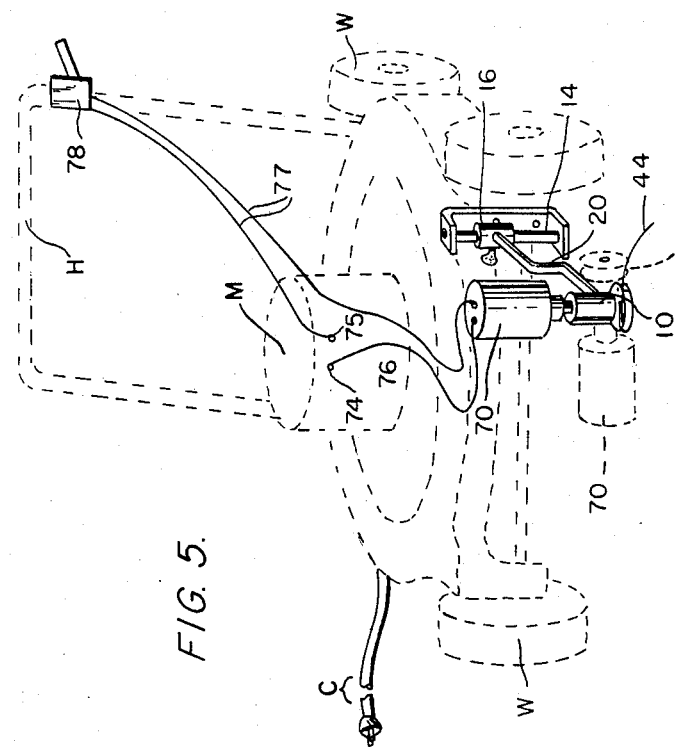
FIG. 7.
FIG. 8.
FIG. 6.
FIG. 5.

LAWN MOWER TRIMMER AND EDGER ATTACHMENT

BACKGROUND AND PRIOR ART

This invention relates to edger and trimmer attachments to be added to a power lawn mower, and more particularly relates to attachments for edging and trimming grass wherein the attachment can be mounted on a wide variety of lawn mowers and other such vehicles, and can be selectively rendered operable or inoperable during use of the vehicle.

The ordinary lawn mower is unable to pass close enough to a raised obstruction to trim the grass all the way up to it, and in addition is not equipped for edging along a sidewalk or garden periphery. Separate machines are sold for accomplishing such edging and trimming purposes, and they usually have a cutting head supported on the end of a long handle that can be oriented horizontally for trimming, or vertically for edging during use. Numerous attempts have been made to provide an attachment for power mowers to accomplish edging and trimming functions, but they have undesirable features which the present disclosure seeks to improve.

U.S. Pat. No. 4,453,372 to Remer, U.S. Pat. No. 4,170,099 to Owens, U.S. Pat. No. 3,531,922 to Hansen, and U.S. Pat. No. 3,236,037 to Porterfield are among a group of patents which show attachments driven from pulleys or friction drives located within the skirt of a rotary mower, which location makes their drives subject to clogging and slippage caused by the accumulation of cuttings. Some other patents avoid this problem by taking drive from above the cutting skirt area, as shown for example in U.S. Pat. No. 4,242,855 to Beaver, U.S. Pat. No. 3,871,160 to Hooper, U.S. Pat. No. 3,604,208 to Borunda, and U.S. Pat. No. 3,407,579 to Decker.

Others of the disclosures show various mountings for the cutting head to the mower frame, but none in which the head is adjustable continuously as to height above the ground, azimuth angle with respect to the frame, and inclination of the plane of the rotating disc and flail member. For example in Remer U.S. Pat. No. 4,453,372 there are several different angular orientations possible, but only to the extent that there are milled slots in the mounting block 74. In U.S. Pat. Nos. 3,191,368 to Hidalgo, U.S. Pat. No. 3,193,996 to Wellborn, U.S. Pat. No. 3,693,334 to Lowery 3,531,922 to Hansen, U.S. Pat. No. 3,236,037 to Porterfield, and U.S. Pat. No. 3,604,208 to Borunda there is some adjustment in at least one direction, but the mountings are complicated and usually quite limited in their adjustability.

Moreover, none of the known prior art shows any structure which will allow interchangeable cable drive or electric motor drive for the cutting head, so arranged as to facilitate quick and easy drive-type changeability to make the attachement useable on different types of push and riding mowers.

THE INVENTION

The present invention comprises a cutting head and mounting system for adjustably supporting the cutting head on a mower, and a variety of several different types of motor and flexible cable drives which are attachable to the head and quickly and easily changeable from one type of drive to another. The mounting assembly for the head comprises a mower mounting bracket having an upright post on which a sleeve is vertically and angularly positionable. The sleeve in turn carries a rod which extends from the bracket and mower and supports the cutting head at its outer end in a boss which slides onto the rod and is adjustably attached thereto, whereby the inclination of the head can be selectively fixed in any desired position between horizontal and vertical orientation. At the end of the head opposite its cutting flail members, there is a quick disconnect joint which allows, either an electric motor to be mounted and energized through a switch by electrical power available aboard the mower, or alternatively allows a cable drive to be mounted which drives the head from a friction drive mechanism taking power from the mower engine shaft, the friction drive being selectively engageable by means of a Bowden control cable. A guard to deflect cuttings away from the operation is mounted on the cutting head.

OBJECTS AND ADVANTAGES OF THE INVENTION

It is a principal object of the invention to provide a trimmer and edger attachment for a lawn mower which is light weight, and economical to manufacture, and which is quickly and easily installable on a wide variety of lawn mowers including push mowers, riding mowers, electric mowers and engine driven mowers.

Another major object of the invention is to provide a trimming and edging attachment having a cutting head which is mounted on the mower by a simple and inexpensive mounting assembly, which has the advantage of making the position of the cutting head continuously variable over an adequate range of positions in vertical directions, in horizontal azimuth directions, and in inclination of the head continuously between vertical orientation and horizontal orientation of the cutting plane of its flail member without requiring the use of tools.

A further major object of the invention is to provide an attachment in which the type of drive for the cutting head is quickly and easily selectible using quick detach means so that the best type of drive for the cutting head for use with a particular mower can be easily selected and installed.

It is a corollary object of the invention to provide a flexible cable drive system that can be attached at its drive end to a lawn mower engine having either a vertical shaft or a horizontal shaft, the cable drive being then attachable at its cutter end to the cutting head without any changes being necessary in the head structure to receive the cable, which is held in place by simple Allen set screws. The drive end of the cable is friction driven by the engine of the mower, and a Bowden wire control is provided for selectively engaging and disengaging the drive as needed.

A further corollary object of the invention is to provide a cutter motor, either AC or DC depending on whether the mower has AC or DC power on board, and the cutter motor being attachable to the cutting head without any alteration being necessary in the head structure to mount the motor, which likewise is held in place by simple Allen set screws. The motor is then connected to the mower's electrical power source through a switch so that it can be turned on and off as needed.

Other objects and advantages of the invention will become apparent during the following discussion of the drawings.

BRIEF DESCRIPTION OF THE DRAWINGS

FIG. 1 is a perspective view showing a mower and showing a trimmer attachment according to this invention connected thereto and receiving drive from the mower engine;

FIG. 2 is a perspective view showing friction coupling of a flexible drive cable to the mower engine to selectively obtain drive for the attachment;

FIG. 3 is an enlarged perspective view showing a mounting assembly for adjustably supporting the cutting head of the attachment on the mower frame;

FIG. 4 is an enlarged exploded detail view showing the mounting of a flail element filament to the attachment cutting head;

FIG. 5 is a view similar to FIG. 1, but showing a modified attachment in which the cutting head is driven by its own electric motor;

FIG. 6 is a view showing a further modified embodiment of the invention wherein the attachment is supported by a riding mower or similar vehicle and uses the battery in the vehicle to power the drive motor of the attachment;

FIG. 7 is an enlarged exploded partial perspective view showing the quick attachment joint by which a drive motor is attached to drive the cutting head, and showing the guard on the head for deflecting cuttings away from the operator; and FIG. 8 is an enlarged exploded partial perspective view showing a similar quick attachment joint by which a drive cable is attached to drive the cutting head.

DESCRIPTION OF ILLUSTRATIVE EMBODIMENTS

Referring now to FIGS. 1 through 4 showing one embodiment of the invention, the attachment is shown mounted on an engine driven lawn mower of the rotary type having a frame F having a downwardly extending skirt D enclosing rotary mower blades (not shown). The mower carries an engine E supported on the frame F, the engine having a vertical shaft S, although the present invention will work just as well with drive taken from a horizontal-shaft engine. The mower rolls on wheels W and has a handle H extending above the frame F and carrying engine controls which are not shown in this illustration. The above mentioned parts of the mower and engine are deemed to be conventional and, per se, form no part of the present invention.

In the illustrative embodiments shown in FIGS. 1–5, a cutting head 10, used for trimming and edging, is supported on the frame F of the mower by a mounting assembly, FIGS. 1 and 3, which comprises a bracket 12 bolted to the frame in upright position. The bracket 12 supports a vertical post 14, which is maintained rigidly fixed with respect to the frame, and which in turn supports a sleeve 16 which is slidable and rotatable on the post for the purposes hereinafter explained. When a desired position for the sleeve 16 on the post 14 has been selected, a butterfly screw 18 is tightened to maintain that position. The sleeve 16 in turn supports the inner end of a rod 20 extending radially from it and having an outer end which supports a hollow boss 22 which is fixed to the cutting head 10 and supports it, the boss having a locking screw 24 which can be tightened manually to fix the angle of tilt of the head 10 and boss 22 on the outer end of the rod 20, FIG. 3. With the cutting head thus supported, it can be raised or lowered by adjusting the height of the sleeve 16 on the post 14; it can be moved in horizontal angular position with respect to the mower frame F by rotating the sleeve 16 about the post 14; and it can be angularly tilted by rotating the boss 22 about the rod 20. The head 10 can also be completely removed from the rod 20 after loosening the locking screw 24.

The cutting head 10 structure will be described in greater detail with reference to FIGS. 4 and 7. In the embodiment shown in FIGS. 1–3 and 8, it has a flexible drive cable 26 extending upwardly out of it and having an internal rotating core 28 which connects into the rotating spindle 30 of the head 10, as shown in FIG. 8. The lower end of the spindle 30 is tapped at 32 to receive a screw 34 and washer 36 to hold two circular cutting head discs 38 and 40 against the spindle 30. The discs 38 and 40 have aligned holes to receive one or more pins 42 (one shown), each of which pivotally supports a flail member filament 44, preferably a plastic monofilament. As shown in FIGS. 1, 3 and 5, the cutting head 10, discs 38 and 40, and flail member can be rotated from a horizontal cutting plane position (shown in solid lines) to a vertical cutting plane position (shown in dashed lines) or to any intermediate inclined position therebetween.

The drive end 50 of the cable 26, FIG. 2, is fixed in a support plate 52 which is articulated to a mounting plate 54 by a pivot 56. Below the support plate 52 is journaled a drive wheel 56 that is connected to the rotating core 28 of the drive cable 26. The mounting plate 54 is screwed to the top of the housing of the engine E, and also supports in a conventional manner the lower end of a Bowden wire control cable 60, whose upper end terminates in a control assembly having a control arm 62, all of conventional design. In the presently discussed embodiment, the drive disc 64 is mounted either on the engine flywheel (not shown), or on the end of the shaft S as shown in FIG. 2, as may be convenient, and rotates with the engine E adjacent to the drive wheel 56. When the control arm 62 is moved back and forth, the Bowden wire 60 rotates the support plate 52 about the pivot 56 and moves the drive wheel 56 into or out of engagement with the drive disc 64, either to drive the cable 26, or to leave it undriven, depending on the position of the control arm 62. The drive disc 64 may be made of rubber, or its periphery may have a rubber ring 66 around it to provide non-slipping drive to the drive wheel 56 when engaged with it. The ratio of the diameters of the drive disc 64 and the drive wheel 56 are selected to provide high speed rotation to the cutting head discs 38 and 40 to provide sufficient centrifugal force to keep the flail member filament 44 well extended.

There are many different types of mowers on the market and in use, some of which do not have gasoline engines suitable for the type of cable drive shown in FIGS. 1–4. FIG. 5 shows an electric lawn mower having a frame K supporting ground engaging wheels W and carrying an electric motor M, the mower being propelled by a push handle H. In this embodiment, the trimmer attachment is mounted similarly to that described in connection with FIGS. 1 and 3, by a mounting assembly including a bracket 12 supporting a post 14 carrying a sleeve 16, which sleeve supports a horizontal rod 20 carrying at its outer end a cutting head 10 including a boss 22 adjustably positioned on the rod 20. The cutting head, however, instead of supporting the end of a drive cable 26 as in FIG. 1, supports an AC drive motor having a shaft 72, FIG. 7, which couples at its outer end to the rotating spindle 30 of the head 10 which in turn supports the rotating discs 38 and 40 mounted to it as shown in FIG. 4. The motor 70 is mounted on and supported by the head 10, FIG. 7, so that when the boss 22 is rotated about the end of the rod 20, the motor 70 and discs 38 and 40 can be selectively tilted to any desired cutting plane position and sustained therein by the locking screw 24. The boss 22 and locking screw 24 are not seen in FIG. 5, but are the same as shown in FIG. 3. In FIG. 5, the AC motor is driven through wiring connected to the AC power lines by the electric cord C of the mower, wiring terminals 74 and 75 being shown merely schematically in FIG. 5. The motor is connected directly to the terminal 74 through the wire 76 and is connected through a switch 78 to the terminal 75 via the wires 77.

Some lawn mowers have a gasoline engine which is started by a battery carried on the frame of the mower. In such a case, the cutting head can be driven either by a cable and disc drive assembly as shown in FIG. 1, or alternatively can be driven by a DC electric motor that would be the same in shape and mounting as the motor 70 shown in FIG. 5, but would run from DC power taken from the mower battery.

In larger riding type mowers, or other tractor type vehicles, as shown in FIG. 6, a DC motor 80 can be mounted on the frame V of the vehicle and driven by the vehicle's starting battery B. The motor is wired to the battery through wires 82 and a switch 84 in a manner well known per se.

FIGS. 7 and 8 show a quick detach connecting joint by which either an electic motor such as the motor 70 or 80 can be attached to drive the cutting head 10, or else a drive cable 26 can be used to drive the head. The change requires only an Allen wrench to loosen or tighten the set screws shown in those assembly views. The head 10 carries a bearing housing 11 fixed to it, and the spindle 30 passes through this housing. Each end of the housing is recessed as at 13 to receive a bearing 15, which bearings 15 are held against shoulders 33 of the spindle 30 by means of C-clips 31, FIG. 4. The upper end of the spindle is internally threaded as at 35 to receive the threaded end of the motor shaft 72, FIG. 7, or to receive the threaded end 29 of the drive cable core 28, FIG. 8. Both motors 70 and 80 carry identical mounting rings 73, the motor mounting ring having an internal bore 75 shaped to receive the upper end of the bearing housing 11 to which it is clamped by set screws 77. The threaded engagement 35,72 is tightened as the motor rotates the spindle 30.

In FIG. 8, the cutting head 10, spindle 30, and bearing housing 11 are the same as in FIG. 7. The drive cable 26 carries a mounting ring 25 fixed thereto and having a bore 27 shaped to receive the upper end of the bearing housing 11, the ring being held on the housing by set screws 23. As the cable ring 25 is pushed onto the housing 11, the discs 38 and 40 and the spindle 30 are rotated to screw the threaded end 29 of the cable into the threaded end 35 of the spindle 30, the direction of drive of the cable tending to tighten this threaded engagement.

Since the cutting head is so easily detached from the drive means, it can be sold separately therefrom so that a purchaser can buy whatever combination best suits his mower.

As can be seen in FIG. 7, a cuttings guard 80 is mounted at its inner end 84 on the cutting head 10, typically by welding, the guard having a flange 82 around its peripheral edge closest to the operator to deflect cuttings away from him. The guard 80 is part of the head and changes its angle with respect to the ground as the head 10 changes the angle of tilt of its cutting plane.

This invention is not to be limited to the illustrative embodiments shown in the drawings, for obviously changes can be made within the scope of the following claims.

I claim:

1. A trimmer and edger attachment especially constructed to be fitted to a lawn mower having a frame and having a source of power on the frame, the attachment being adaptable quickly and easily to be driven by the type of electrical or mechanical power available on the frame of the mower, comprising:

(a) a cutting head assembly including a cutting head having a bearing housing and having a spindle supported in bearing means for rotation about an axis of the housing and having flail means fixed to the spindle and when rotated thereby defining a cutting plane, and the cutting head assembly further including head mounting means including a bracket fixed to the mower frame and supporting adjustable means connected between the bracket and the bearing housing and operative to lock the bearing housing at a selected height and horizontal angular position with respect to the mower frame and operative to lock the bearing housing at a selected angle of inclination of the cutting plane of the flail means with respect to the ground;

(b) multiple selectible different types of drive means each cooperative with one of said types of available power and each directly mountable on the bearing housing and each having a drive shaft directly connectable to the spindle;

(c) and the cutting head assembly and drive means having quick-detach connecting means constituting the sole means for supporting the drive means on said bearing housing and for connecting its shaft with said spindle, the quick-detach means comprising cooperatively mating connecting means on the bearing housing and on the drive means and cooperatively mating connecting means on the spindle and on the drive shaft, means for removably securing said mating connecting means together whereby different ones of the drive means can be interchangeably selected and cooperatively connected to drive the cutting head and to follow said bearing housing into whatever position it is locked by said adjustable means, and means for selectively connecting and disconnecting the coupled drive means with respect to said power source.

2. The trimmer and edger attachment as claimed in claim 1, wherein said source of power on the frame of the mower comprises an engine having an engine housing, and wherein the drive means of the attachment further comprises a flexible drive cable having a core comprising said shaft; means for mounting one end of the flexibe cable to said cutting head with the core connected to drive the spindle and flail means, and the other end of the cable core carrying a drive wheel; a drive disc carried on to of and rotating with said engine; and said connecting and disconnecting means comprising pivotal support means mounted on the engine housing and supporting the other end of the cable with its drive wheel adjacent to the drive disc; and control means for pivoting the support means selectively to bring the drive wheel into and out of friction drive contact with the drive disc.

3. The trimmer and edger attachment as claimed in claim 1, wherein said source of power on the mower frame is a source of electrical power, and wherein the drive means of said attachment further comprises an electric motor and shaft; said quick-detach means mounting the electric motor on said cutting head opposite said flail means with the motor shaft being connected to drive said spindle and flail means; said connecting and disconnecting means comprising an electrical control switch; and electrical wiring connecting the electric motor to the source of electrical power through said control switch.

* * * * *